United States Patent [19]

Cavalli

[11] Patent Number: 4,681,458

[45] Date of Patent: Jul. 21, 1987

[54] APPARATUS FOR PREPARING ICE CREAM AND THE LIKE

[76] Inventor: Alfredo Cavalli, Via Galileo Galilei, 9, 20060 Pessano con Bornago (Milan), Italy

[21] Appl. No.: 844,799

[22] Filed: Mar. 27, 1986

[30] Foreign Application Priority Data

Apr. 2, 1985 [IT] Italy .............................. 21308/85[U]

[51] Int. Cl.[4] ............................................. A23G 9/00
[52] U.S. Cl. ..................................... 366/149; 62/342; 99/455; 366/295
[58] Field of Search ............... 366/144, 145, 149, 147, 366/293, 295; 62/342, 343; 99/452, 453, 455, 348

[56] References Cited

U.S. PATENT DOCUMENTS

| 2,555,624 | 6/1951 | Anderson | 366/144 X |
| 3,465,540 | 9/1969 | Carpigiani | 62/343 |
| 4,429,549 | 2/1984 | Randolphi | 366/149 X |

Primary Examiner—Timothy F. Simone
Attorney, Agent, or Firm—Hedman, Gibson, Costigan & Hoare

[57] ABSTRACT

This apparatus ensures improved dissipation of heat from the condenser for the refrigerating cycle. This result is attained by having a blower mounted coaxially with the shaft of the mixing paddle but freely with respect thereto; the blower is driven by the motor at a much higher speed than the mixing paddle. Furthermore, in order to best utilize the air flow from the blower, the condenser is ducted within a shrouding case.

1 Claim, 3 Drawing Figures

APPARATUS FOR PREPARING ICE CREAM AND THE LIKE

DESCRIPTION

This invention relates to an apparatus for preparing icecream and the like cold products for domestic consumption.

In general, such apparatus would comprise, within a box-type case, an icecream-forming vessel, which is suitable cooled by an evaporator of a refrigerating system adapted to cause an appropriate refrigerating fluid to perform a refrigerating cycle; a mixing paddle driven by an electric motor is arranged to act within the icecream-forming vessel. The refrigerating system includes a condenser which is to dissipate all the heat generated in the system, that is the heat removed from the icecream-forming vessel plus the heat transferred to the refrigerating fluid from the other components of the system (specifically, from the compressor and the conduits).

Thus, with apparatus of that type, of special import is the condenser ventilation, in order for all the heat generated through the system to be dissipated, and the apparatus to operate regularly.

With such prior apparatus, ventilation is accomplished by means of a blower keyed to the motor shaft. The blower is designed to create an air flow through the condenser, by either sucking air from the outside into the apparatus through the condenser, or blowing air from the inside out, again through the condenser.

This invention has for its object the provision of an apparatus for preparing icecream and the like cold products, wherein the flow of air through the condenser is significantly improved.

This object is achieved, according to the invention, by an apparatus as indicated, characterized in that it comprises an icecream-forming vessel, a drive shaft driven by an electric motor, a mixing paddle mounted on said shaft and acting within said icecream-forming vessel, a refrigerating system with an evaporator encircling said icecream-forming vessel, a condenser, a blower for flowing air through said condenser and being mounted rotatably on said drive shaft coaxially therewith and below said icecream-forming vessel, it being linked mechanically to said electric motor.

Further features and the advantages of an apparatus according to the invention, will be more clearly understood from the following description of a preferred embodiment thereof, given with reference to the accompanying drawings. In the drawings.

Figure 1:
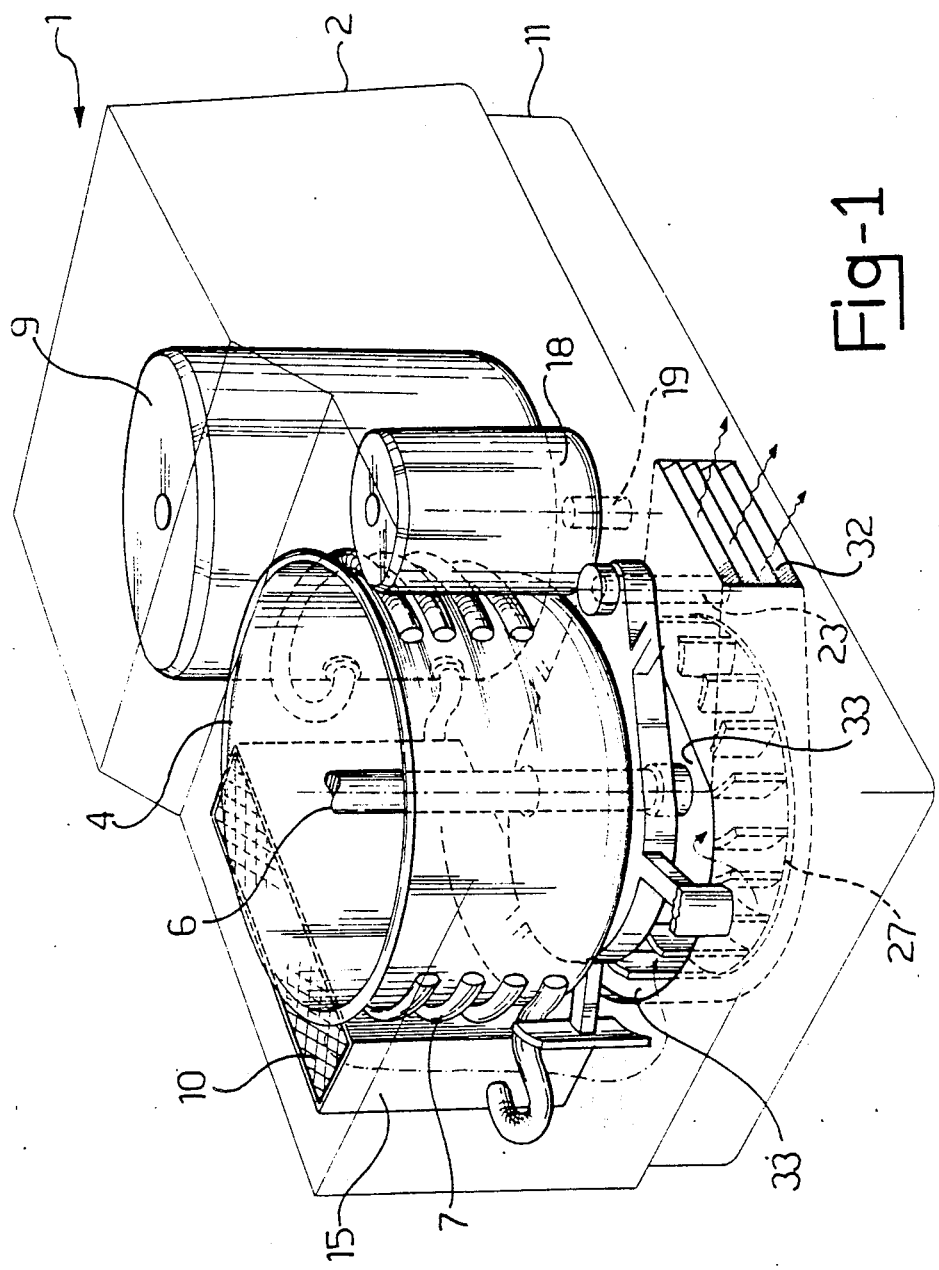
FIG. 1 is a perspective view showing schematically an apparatus according to the invention.
Figure 2:
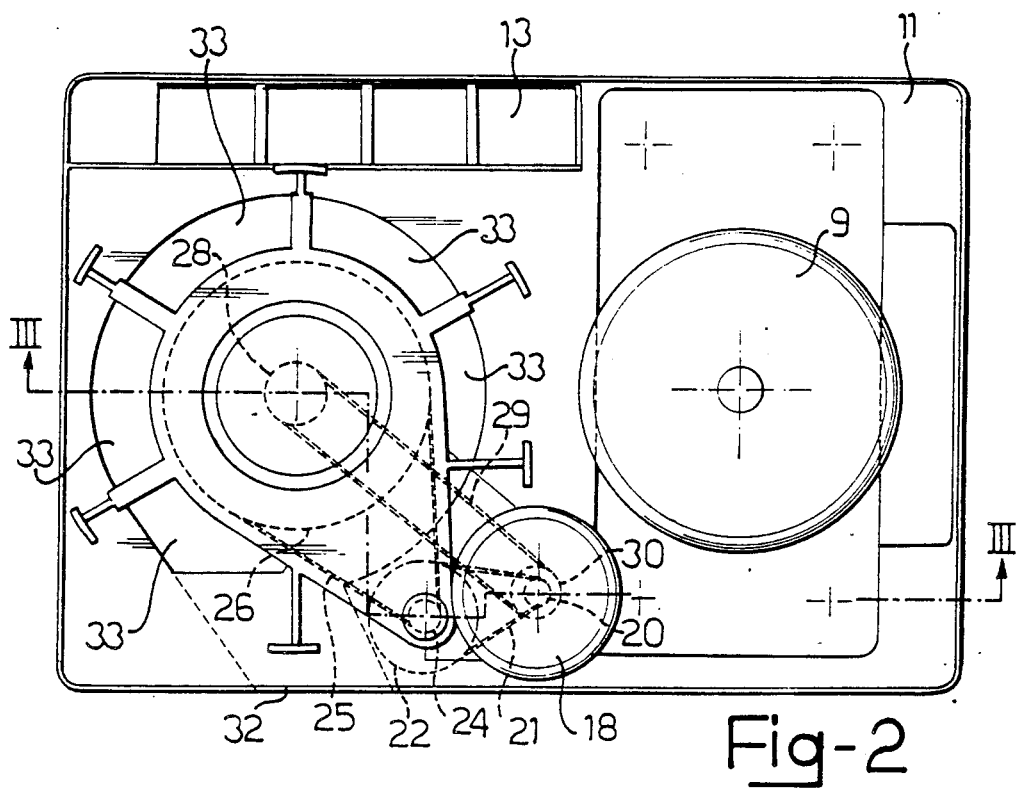
FIG. 2 is a plan view of part of the apparatus of FIG. 1.
Figure 3:
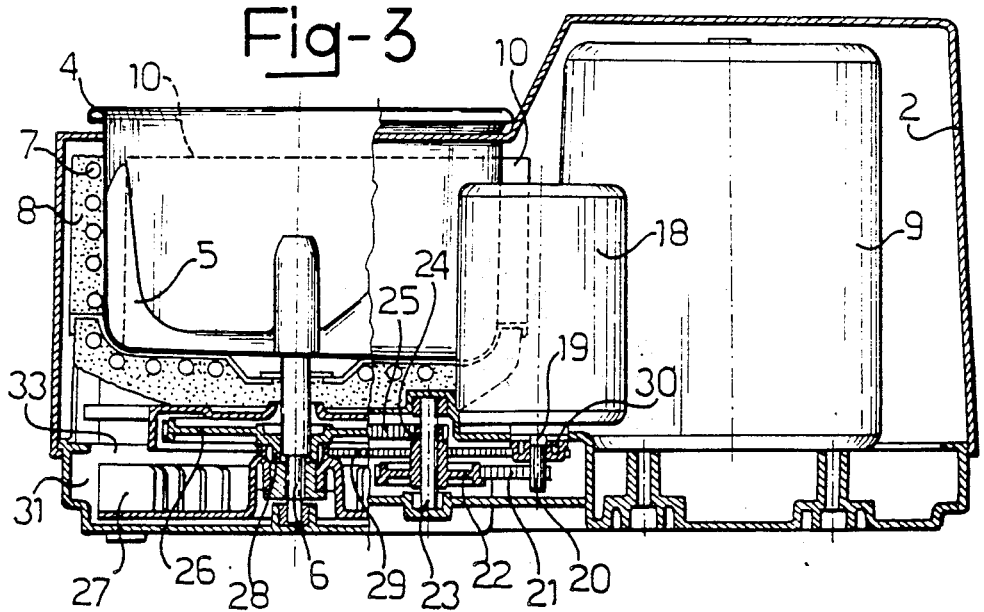
FIG. 3 is a section taken along the broken line III—III of FIG. 2.

An apparatus 1 for preparing icecream and the like cold products comprises an air-tight box-type case 2.

Within the box-type case 2, there is supported an icecream-forming vessel 4, of substantially cylindrical shape and being open at the top. In the vessel 4, a mixing paddle 5 is active which is mounted removably on a drive shaft 6. The case 4 is surrounded by a cooling pipe coil 7, surrounded, in turn, by a heat-insulative layer 8.

The cooling pipe coil 7 forms the refrigerating system evaporator, being through-passed by a refrigerating fluid, the system also includinhg a compressor 9 and condenser 10, in addition to conduits, valves, the fittings not explicitly represented in the drawings. All of the elements mentioned thus far are supported, within the case 2, on a bottom base.

The condenser 10, formed by a finned pipe coil, has a parallelepipedic, vertically extending configuration; it is positioned in the case 2 above an opening 13 formed through the base 11 of the case 2.

The condenser 10 is ducted inside a substantially parallelepipedic shroud having closed side walls 15 and open top and bottom bases; the bottom base is superimposed on the opening 13 and has substantially equal dimensions to the latter.

The drive shaft 6 is driven rotatively by an electric motor 18 housed in the case 2. For this purpose, the motor 18 has an output shaft 19 carrying a pinion sprocket 20 rigid therewith and mechanically connected by a cogged belt 21 to a sprocket wheel 22, attached to a pivot 23 journalled on the base 11; the pivot 23 has a pinion sprocket 24 rigid therewith which is connected mechanically, via a cogged belt 25, to a sprocket wheel 26, attached to the drive shaft 6 below the icecream-forming vessel 4.

A blower 27, of the centrifugal vane type, is journalled to the drive shaft 6, below the sprocket wheel 26; the blower 27 has a hub 28 in the form of a sprocket wheel which is connected drivingly, by a cogged belt 29, to a sprocket wheel 30 rigid with the output shaft 19 of the electric motor 18.

The blower 27 is active inside a chamber 31, formed in the base 11, which has a grid screened outlet 32, cut through a side of the case 2, and plural upper inlet ports 33, opening toward the interior of the case 2.

With the apparatus 1 in operation, the blower 27 is driven rotatively by the motor 18; since its drive is separate from the drive for the mixing paddle 5, one is allowed to select any of a range of different drive ratios, to provide a high rotational speed for the blower 27 and a slow one for the paddle 5, as is required for icecream forming.

Thus, the blower 27 will blow large amounts of air out of the outlet 32, after drawing it from the case 2 interior through the ports 33. Accordingly, a vacuum will be formed in the case 2 which is effective to draw air in from the outside through the one passage available, i.e. the port 13; the outside air, in order to reach the case 2 inside, will thus flow upwards through the condenser 10 and cool the fluid contained therein.

It should be noted that the faculty of selecting as desired, at the designing stage, the most appropriate rotational speed for the blower 27 affords an air flow of the utmost possible effectiveness. Further, the position chosen for the blower 27 enables it to have an unusually large diameter, which further improves the air flow.

Lastly, it is noteworthy that the large volume air flow provided is utilized in the condenser 10 in a most efficient way, owing to the condenser being ducted between the walls 15.

I claim:

1. An apparatus for preparing ice cream and other frozen products, comprising a sealed cabinet having an inlet port and an outlet port;

a substantially cylindrical ice cream freezing vessel supported in said cabinet;

a paddle means rotatably mounted on a drive shaft extending into said freezing vessel;

a motor mounted in said cabinet for rotating said drive shaft paddle means; and a refrigeration system mounted in said cabinet including an evaporation surrounding said freezing vessel and in thermal contact therewith, a condenser ducted with a substantially parallelepipedic shroud vertically mounted so as to be adjacent said inlet port, a blower rotatably mounted to said drive shaft below said freezing vessel for drawing air from outside cabinet through said inlet port upwardly across said condenser and out from said cabinet through said outlet port.

* * * * *